US008665771B2

(12) United States Patent  (10) Patent No.: US 8,665,771 B2
Nam et al.  (45) Date of Patent: Mar. 4, 2014

(54) SATELLITE MOBILE COMMUNICATION SYSTEMS CONSIDERING EVOLUTION OF SATELLITE MOBILE COMMUNICATION SERVICES MARKET AND METHOD FOR COMMUNICATION USING THE SYSTEM

(75) Inventors: Seung Hyun Nam, Daejeon (KR); Hee Wook Kim, Daejeon (KR); Kun Seok Kang, Daejeon (KR); Do Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 13/090,237

(22) Filed: Apr. 19, 2011

(65) Prior Publication Data

US 2012/0033599 A1  Feb. 9, 2012

(30) Foreign Application Priority Data

Apr. 20, 2010  (KR) .......................... 10-2010-0036485

(51) Int. Cl.
*H04W 72/04* (2009.01)
*H04H 20/71* (2008.01)
(52) U.S. Cl.
USPC .......................................... 370/312; 370/328
(58) Field of Classification Search
USPC ................................ 370/395.4, 458, 459, 468
See application file for complete search history.

(56) References Cited

U.S. PATENT DOCUMENTS

| 6,052,560 | A | * | 4/2000 | Karabinis ..................... 455/12.1 |
| 8,078,101 | B2 | * | 12/2011 | Karabinis et al. ............ 455/12.1 |
| 8,170,474 | B2 | * | 5/2012 | Karabinis et al. ............ 455/12.1 |
| 2005/0043046 | A1 | * | 2/2005 | Lee ............................... 455/502 |
| 2011/0103291 | A1 | * | 5/2011 | Wiberg et al. ................ 370/315 |
| 2011/0103338 | A1 | * | 5/2011 | Astely et al. ................. 370/329 |

FOREIGN PATENT DOCUMENTS

| EP | 1811736 A1 | 7/2007 |
| KR | 2007-0016569 A | 2/2007 |
| KR | 2008-0021785 A | 3/2008 |

* cited by examiner

*Primary Examiner* — Chi Pham
*Assistant Examiner* — Fahmida Chowdhury
(74) *Attorney, Agent, or Firm* — Rabin & Berdo, P.C.

(57) ABSTRACT

Disclosed is a communication method of a satellite mobile communication system. The communication method of a satellite mobile communication system, includes: receiving system information indicating frame intervals in which first user equipments using a satellite radio interface in commonality with a terrestrial radio interface do not perform communications from a base station; accessing the base station in the rest frame intervals other than frame intervals in which the first user equipments do not perform communications, based on the system information; transmitting the system information from the base station to second user equipments using a satellite radio interface optimized for satellite environment; and accessing the base station in the rest frame intervals based on the system information received in the second user equipments.

10 Claims, 14 Drawing Sheets

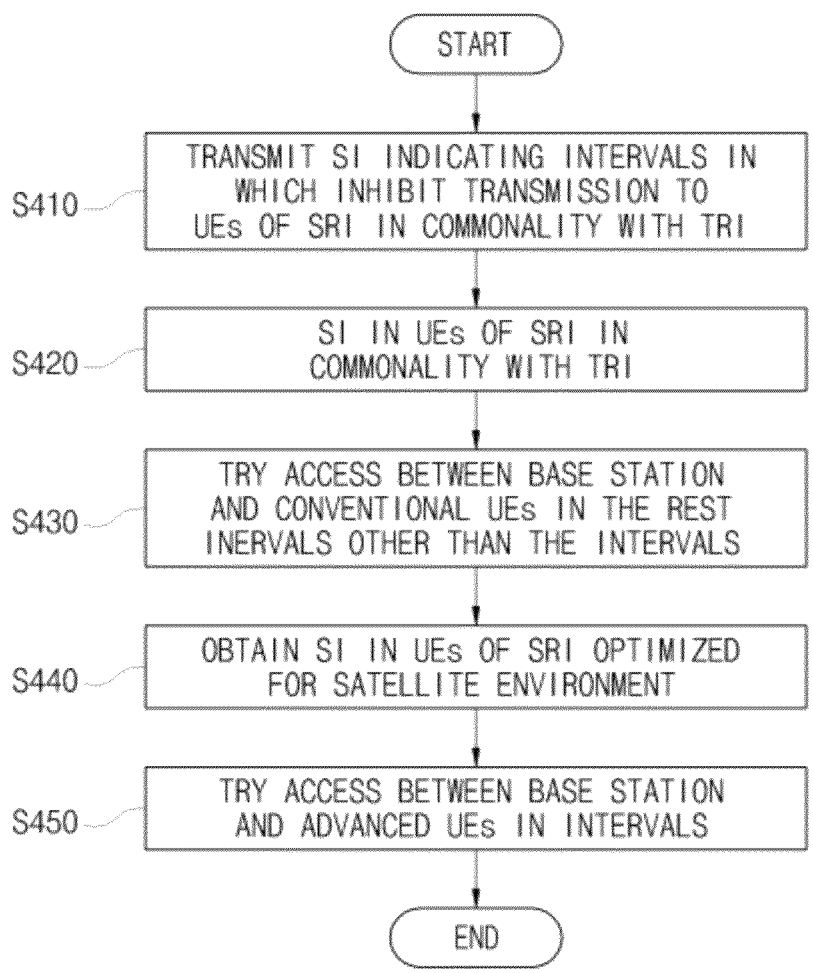

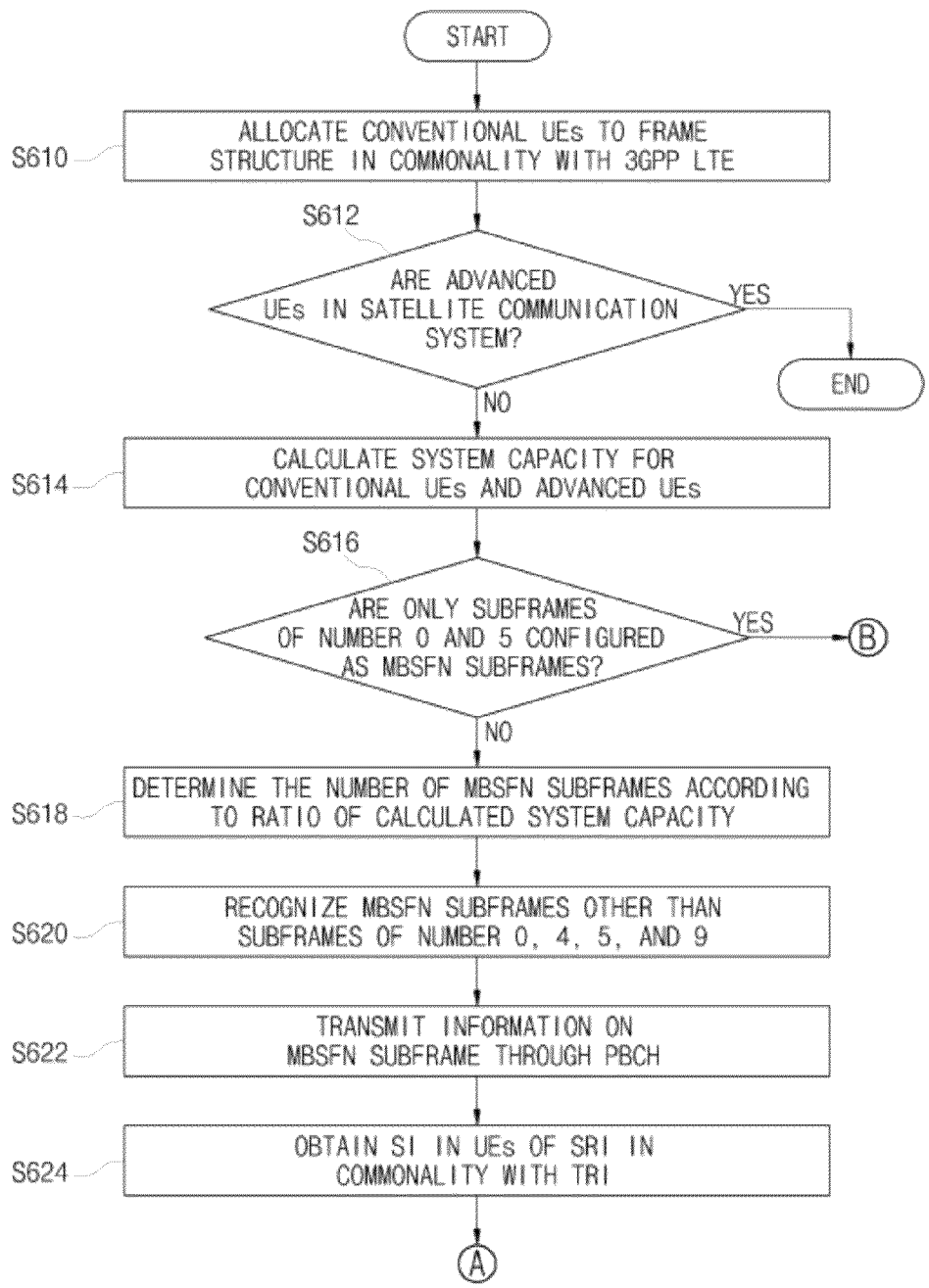

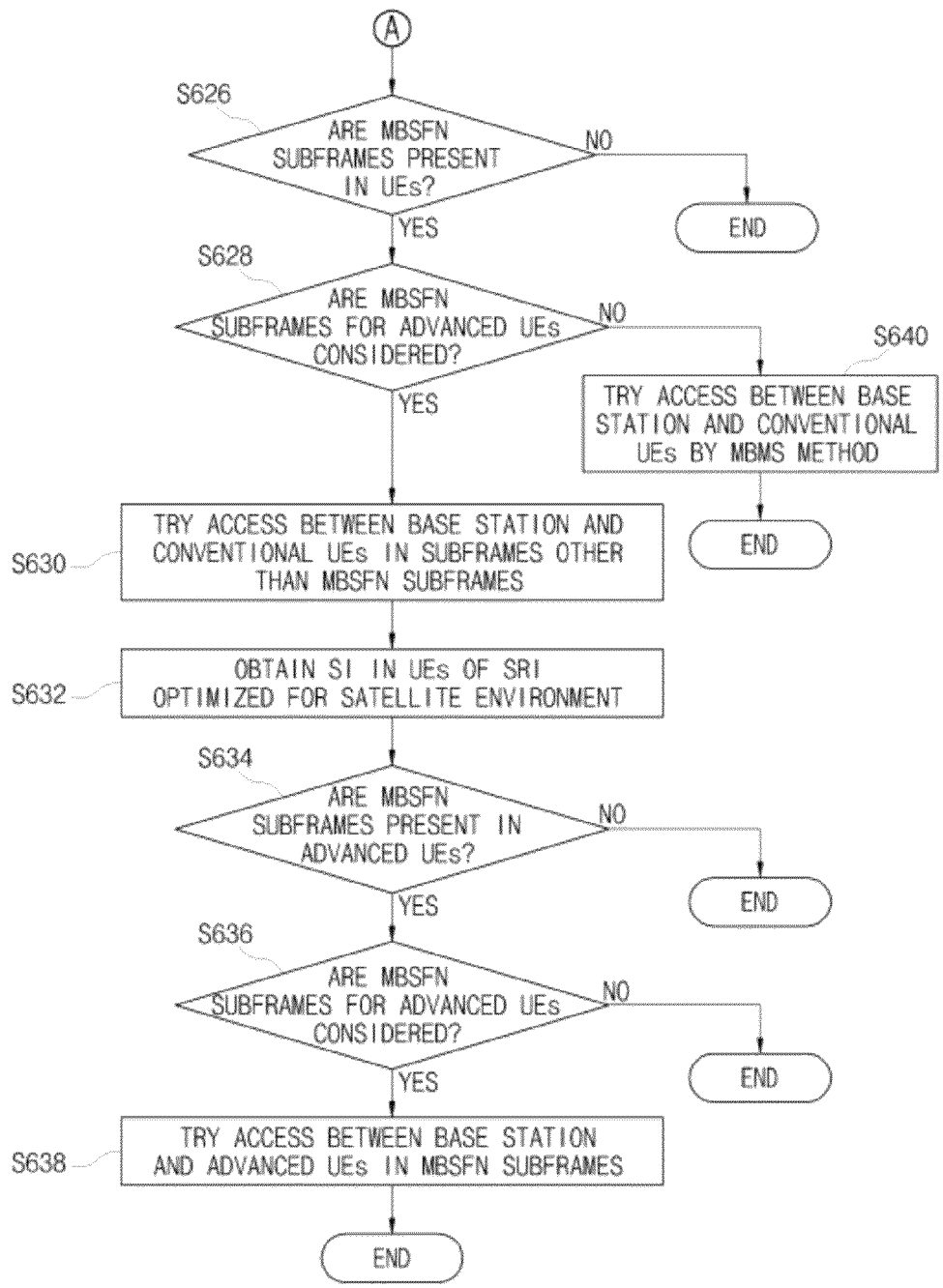

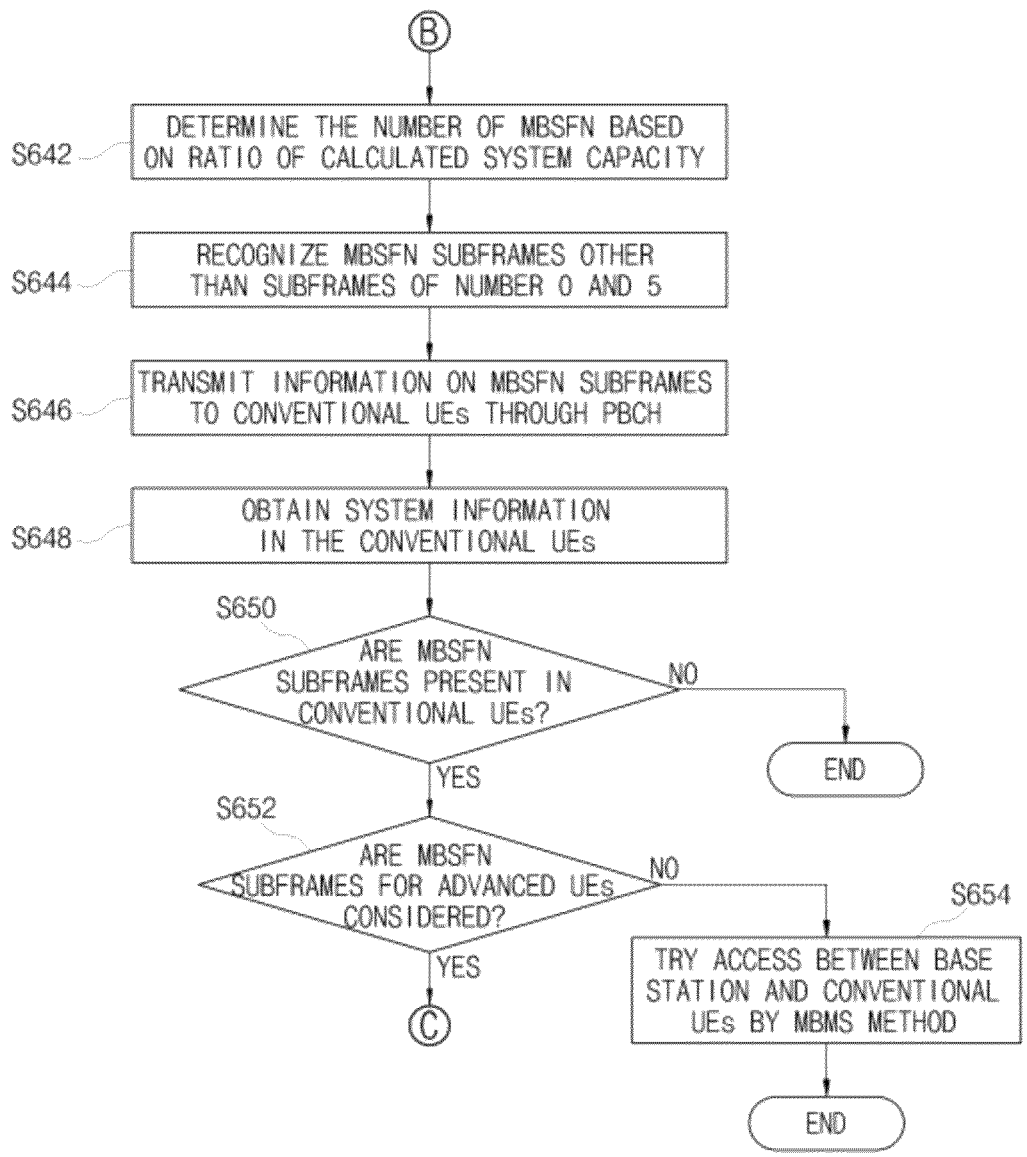

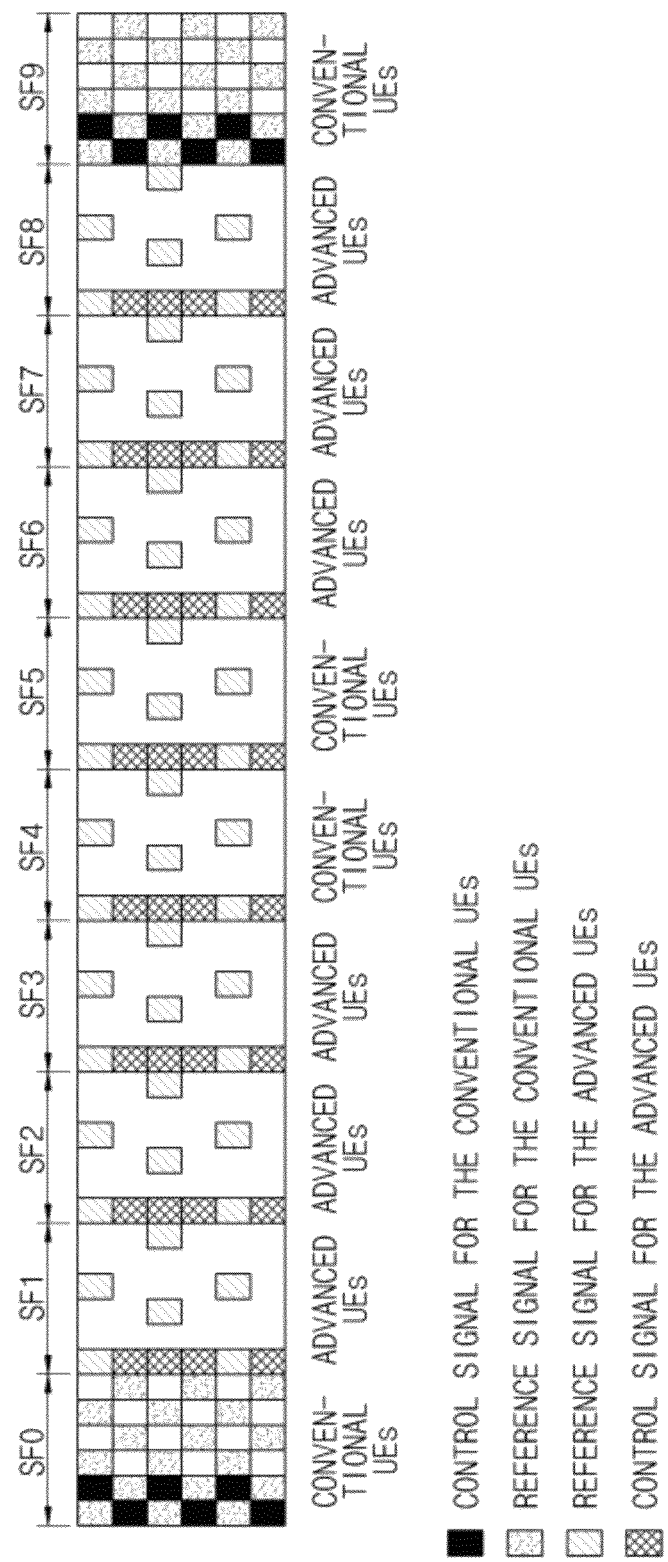

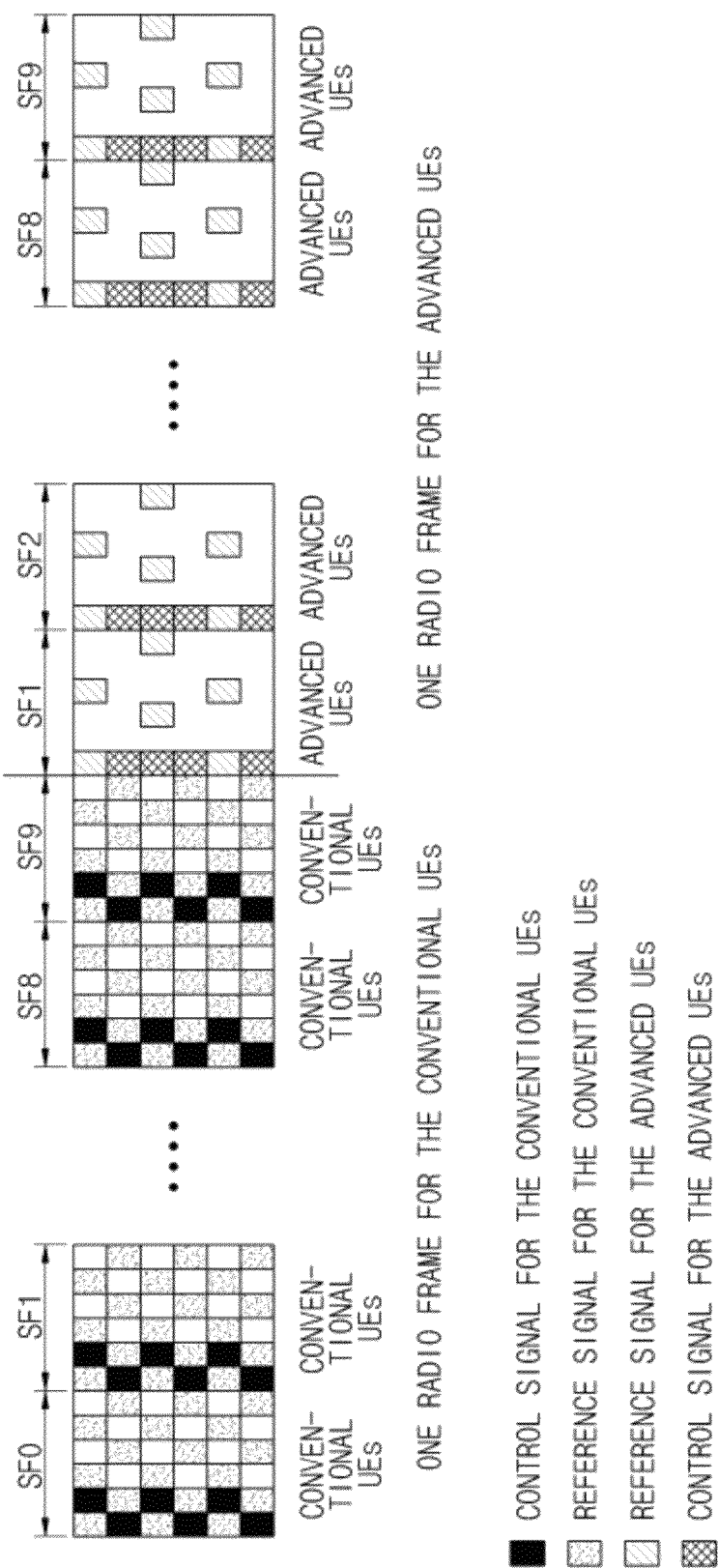

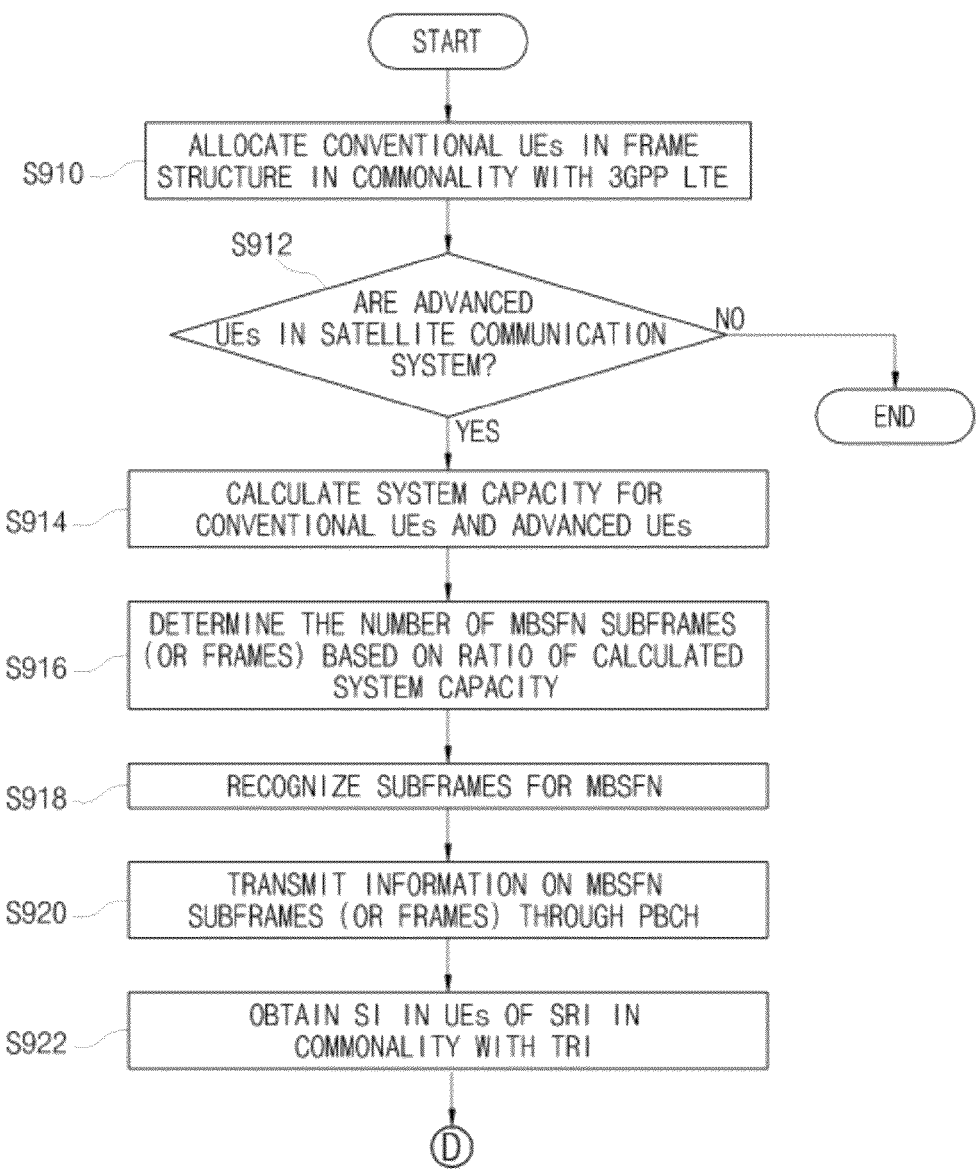

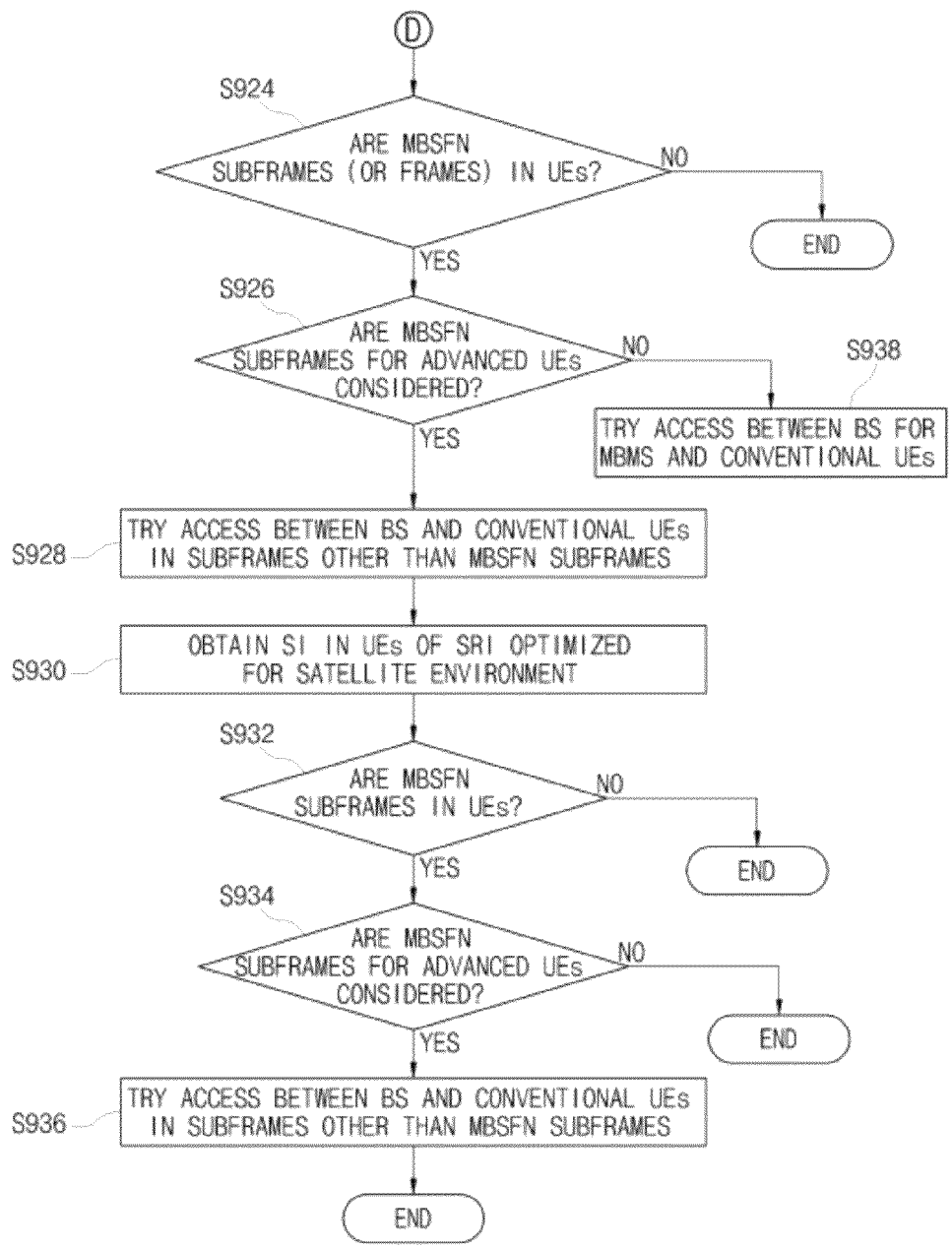

1

SATELLITE MOBILE COMMUNICATION SYSTEMS CONSIDERING EVOLUTION OF SATELLITE MOBILE COMMUNICATION SERVICES MARKET AND METHOD FOR COMMUNICATION USING THE SYSTEM

CROSS-REFERENCE TO RELATED APPLICATIONS

This application claims priority under 35 U.S.C. §119 to Korean Patent Application No. 10-2010-0036485, filed on Apr. 20, 2010, in the Korean Intellectual Property Office, the disclosure of which is incorporated herein by reference in its entirety.

TECHNICAL FIELD

The present invention relates to a satellite mobile communication system and a communication method using the system, and more particularly, to a satellite mobile communication system considering evolution of a satellite mobile communication service market and a communication method using the system.

BACKGROUND

Currently, research and development for a satellite mobile communication system using a complementary terrestrial component (CTC), such as a repeater, a complementary ground component (CGC), and an ancillary terrestrial component (ATC), has been actively progressed worldwide.

In case of Korea, a satellite digital multimedia broadcasting (DMB) system currently provides services. On the other hand, in case of Europe, research into a digital video broadcasting—satellite services to handhelds (DVB-SH) system has been actively progressed for providing broadcasting services by 2010. A subsidiary of SkyTerra Communications, Inc. in U.S.A. Mobile Satellite Ventures and Terrestar™ have developed a terrestrial satellite integrated system for providing audio and data communications using an ATC at the downtown area and the suburbs.

First, a satellite DMB system in Korea is designed to allow a receiver for a vehicle or a fixed or portable receiver to receive high-quality audio signals and multimedia signals by auxiliarily using a terrestrial network using a co-channel gap filler together with a satellite. The satellite and terrestrial systems are optimized in a band of 2630 to 2655 MHz. The system is configured to include a feeder link earth station and a broadcasting satellite, two types of terrestrial repeaters, and a receiver (vehicle, fixed, portable).

First, transmission signals are transmitted to a satellite through the feeder link earth station. In this case, an uplink line uses a band (ex, 14 GHz) for a fixed satellite service (FSS). The received signals are converted into a 2.6 GHz band in the satellite and amplified at a desired size using an amplifier in a satellite repeater, which are in turn broadcast to service areas.

A user of the system may receive signals using a small antenna having low directivity. To this end, the small antenna needs to have a sufficient magnitude of equivalent isotropic radiated power (EIRP). For this reason, a satellite vehicle needs to have a large-sized transmitting antenna and a high output repeater. An example of main problems caused at the time of propagating signals of 2.6 GHz band may include shadows and obstacles on a direct path from a satellite. In order to overcome the above problems, a repeater of retransmitting satellite signals is added in a system design.

The repeater supplements portions that are covered by obstacles such as buildings. The repeater is divided into a direct amplification repeater and a frequency conversion repeater.

The direct amplification repeater is designed in a type which simply amplifies broadcasting signals of 2.6 GHz received from a satellite and is essentially designed in a type of a low gain amplifier so as to avoid unnecessary divergence due to signal interference generated between receiving and transmitting antennas. The direct amplification repeater covers a narrow area up to 500 m based on a line of sight (LOS).

On the other hand, the frequency conversion repeater covers a wide area up to 3 Km and converts and transmits the received signals of 2.6 GHz band into another frequency band (for example, 11 GHz). In the environment, multi-path fading that receives at least two signals occurs. The system uses a rake receiver that uses a code division multiplexing (CDM) technology so as to stably receive multi-path fading signals.

The DVB-SH system in Europe is a system that uses a satellite in nationwide coverage and uses CGC in indoor environment and terrestrial coverage. The DBV-SH system in Europe aims to provide DVB-H based mobile TV services at 15 MHz bandwidth of S band. Since the DBV-SH system uses a band approximating a band for international mobile telecommunication (IMT) of S band, the integration with the IMT terrestrial part is easily performed and the network reuse with a terrestrial network is easily performed, thereby reducing installation costs. The DBV-SH system considers a hybrid broadcasting structure with a terrestrial network and considers a structure in which a reuse factor for a CGC cell in a single satellite spot beam is set to be 1 and a reuse factor for a satellite spot beam is set to be 3 so as to effectively use a frequency while solving a signal interference problem between the satellite and the CGC. In this case, France may broadcast 9 TV channels for nationwide coverage through the satellite spot beam and 27 TV channels using a terrestrial repeater in the downtown area or the indoor environment.

Finally, MSV and Terrestar in U.S.A. have developed a geostationary satellite based satellite mobile communication system to provide ubiquitous wireless wide area communication services such as internet connection, voice call, or the like, in an L band and an S band to user equipments such as a personal communication system (PCS) or a cellular phone. The system uses a hybrid wireless network structure in which a satellite is coupled with the ATC, wherein the hybrid wireless network structure is to provide audio or high-speed packet services through the ATC, that is, the terrestrial network in the downtown area or the densely populated area in U.S.A. and Canada and services through a satellite in the country or the suburbs that are not covered by the ATC. The ATC mainly uses a radio interface such as a satellite so as to provide satellite services without almost increasing complexity of a terrestrial user equipment.

On the other hand, when considering only the satellite service without considering commonality with the terrestrial network like a Thuraya system, the satellite mobile system uses the radio interface optimized for the satellite environment like a GMR radio interface, thereby reducing an overhead of a satellite payload and implementing a system optimized for the satellite mobile environment.

However, in the Thuraya system, the user equipment needs to have a dual chip embedded therein for supporting the satellite and terrestrial radio interface so as to use both of the satellite and the terrestrial services, Consequently, the satellite mobile system developed up to now selects one of the commonality with the terrestrial network and the optimization of the satellite environment to use the radio interface so as to be matched with the situations.

However, when the satellite mobile system and the satellite radio interface that are currently developed select one direction to start the satellite mobile service, switching to another direction means the replacement of the entire system in the currently developed system situations, which cannot be realized.

SUMMARY

An exemplary embodiment of the present invention provides a communication method of a satellite mobile communication system, including: receiving system information indicating frame intervals in which first user equipments using a satellite radio interface in commonality with a terrestrial radio interface do not perform communications from a base station; accessing the base station in the rest frame intervals other than frame intervals in which the first user equipments do not perform communications, based on the system information; transmitting the system information from the base station to second user equipments using a satellite radio interface optimized for satellite environment; and accessing the base station in the rest frame intervals based on the system information received in the second user equipments.

Another exemplary embodiment of the present invention provides a satellite mobile communication system, including: first user equipments using a satellite radio interface in commonality with a terrestrial radio interface; second user equipments using the satellite radio interface optimized for satellite environment; a base station accessing the first and second user equipments, wherein the first user equipments receive system information indicating frame intervals in which the first user equipments do not perform communications from the base station and access the base station in the rest frame intervals other than frame intervals in which the first user equipments do not perform communications based on the system information, and the second user equipments receive the system information from the base station and access the base station in the rest frame intervals based on the system information.

Other features and aspects will be apparent from the following detailed description, the drawings, and the claims.

BRIEF DESCRIPTION OF THE DRAWINGS

FIG. 4 is a flow chart for a structure of a flexible frame shown in FIGS. 3A and 3B.

FIGS. 6A to 6D are flow charts showing a communication method that flexibly transits the radio interface using the frame structure shown in FIG. 5.

FIGS. 8A and 8B are diagrams showing the frame structure that more flexibly transits the radio interface using the MBSFN subframes while slightly disregarding the commonality with the terrestrial radio interface according to another exemplary embodiment of the present invention.

FIGS. 9A and 9B are flow charts showing a satellite mobile communication method using the frame structure shown in FIGS. 8A and 8B.

DETAILED DESCRIPTION OF EMBODIMENTS

Figure 1:
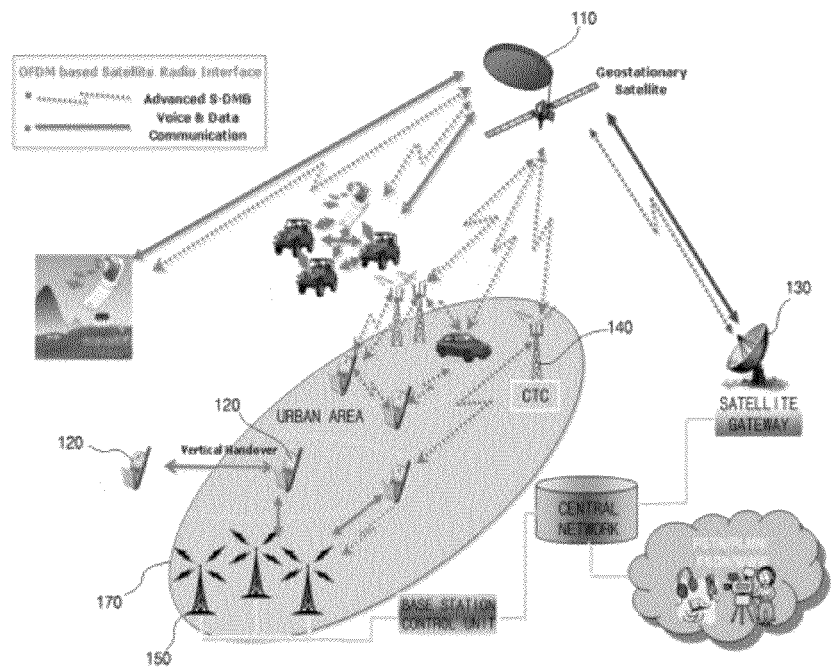
FIG. 1 is a diagram showing a schematic entire structure of a satellite mobile communication system according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, exemplary embodiments of the present invention will be described in detail with reference to the accompanying drawings.

The present invention is to propose a satellite radio interface design considering two approach methods for a system operator to flexibly apply the two approaching methods according to market conditions and a communication method thereof, unlike a satellite radio interface design method developed up to now.

Hereinafter, exemplary embodiments of the present invention will be described in detail with reference to the accompanying drawings.

According to the exemplary embodiment of the present invention, a frame structure design on a 3GPP LTE based personal portable satellite mobile communication system in maximum commonality with a terrestrial system of FIG. 1 and a communication method thereof may be applied regardless of any Complementary Terrestrial Components of repeater, CGC, ATC, or the like, such as satellite DMB of Korea, DVB-SH of Europe and may be applied regardless of any terrestrial access standard and any satellite access standard optimized for satellite environment based on orthogonal frequency division modulation/multiplexing (OFDM), orthogonal frequency division modulation/multiplexing access (OFDMA), code division multiple access (CDMA), WCDMA, time division multiple access (TDMA), frequency division multiple access (FDMA), or the like, that are considered in 3GPP, 3GPP2, IEEE, or the like, in all the satellite mobile system.

A meaning of terms frequently used is as follows. A communication service means software or hardware support that can transmit and receive necessary audio and various data between any two devices. The audio and data are referred to as communication data. The broadcasting service is used as a concept including broadcasting and multicasting. The broadcasting service is a unidirectional service. In this broadcasting services, data configuring contents that is information to be transmitted to a receiving side are referred to as broadcasting data.

FIG. 1 is a diagram showing a schematic entire structure of a satellite mobile communication system according to an exemplary embodiment of the present invention.

Referring to FIG. 1, a satellite mobile communication system according to an exemplary embodiment of the present invention includes a satellite 110, a mobile user equipment 120, a satellite gateway 130, and a complementary terrestrial component (CTC) 140. FIG. 1 shows a geostationary satellite as an example of the satellite 110.

The satellite may be configured by a group of single or several GEO satellites. Each geostationary satellite 110 is configured by mono or multi-spot beam. An area in which a user equipment receiving services from the satellite 110 is located may be a single spot. In the case of roaming user equipments, an area in which the user equipment is located may be configured by a group of several spots.

The user equipment 120 is a device communicating with the satellite 110 using a wireless communication interface and an example thereof may include a cellular phone, a smart phone, or the like, in which a radio module is mounted. The mobile user equipment 120 is connected with a network through a single or several satellites directly communicating with the satellite gateway 130.

The satellite gateway 130 is an interface device for communicating the satellite 110 with other systems or a network. The satellite gateway 130 is one of a centralized gateway or a geographically distributed gateway according to demands of a provider. Although not shown in FIG. 1, the satellite gateway 130 connects a signal to a satellite base station and a satellite control station that is a network subsystem. In this configuration, the satellite base station and the satellite control station perform the same function as a base station and a control station, respectively, in a terrestrial network, which may be present inside or outside the satellite gateway 130.

The complementary terrestrial component 140 is a device that serves as a type of repeater reusing the same frequency as a satellite to amplify and transmit satellite signals. The complementary terrestrial device is an option that may be used in the satellite mobile communication system for coverage continuity in an out of coverage generated due to building, mountain, or the like, during transmission of signals. The complementary terrestrial component (CTC) 140 includes a repeater, a complementary ground component (CGC), an ancillary terrestrial component (ATC), or the like.

When providing the broadcasting service or a multimedia broadcast and multicast service (MBMS) using the satellite mobile communication system shown in FIG. 1, the broadcasting service or the MBMS are provided through the satellite 110 and the complementary terrestrial component 140. That is, the MBMS may be provided through the satellite 110 in a wide coverage such as suburbs, countries, or the like, in which a line of sight (LOS) is secured and the broadcasting service may be provided through the complementary terrestrial device 140 in an urban area 170 such as the downtown area or the indoor environment in which satellite signals are not directly secured due to numerous buildings. Therefore, the complementary terrestrial component 140 that is a kind of a repeater does not provide bidirectional services, that is, audio and data communications services in uplink and downlink and therefore, is generally associated with only the transmission of the downlink and transmits information on the MBMS through a terrestrial system 150 if necessary.

When providing the audio and the data communication, it is almost impossible to provide the communication services to all users in satellite beams having very large coverage using a limited frequency resource. Therefore, in an essentially considered system model, the audio and data services are provided to only a small number of user equipments in an area which is not covered by the terrestrial system 150 in a service area considered by the system.

However, as shown in FIG. 1, when the user equipments 120 that are not covered by the terrestrial system 150 require the uplink signal for the audio and data communication or the MBMS in the area in which the satellite signal is not secured, the complementary terrestrial component 140 may transmit the uplink signal to the satellite.

As can be appreciated from the system model of FIG. 1, the user equipments 120 in the area which is not covered by the terrestrial system 150 receive the audio and data services through the satellite 110 and when the user equipments 120 enter the coverage of the terrestrial system 150, a vertical hand-over receiving services through the terrestrial system 150 providing high transmission efficiency again is generated. In this case, the user equipments 120 may receive both of the terrestrial signal and the satellite signal. When the terrestrial network and the satellite network use a heterogeneous standard, a chip overhead of the user equipment is large. In another satellite mobile communication system according to the exemplary embodiment of the present invention, although not shown in FIG. 1, the OFDM based satellite radio interface in maximum commonality with the OFDM based terrestrial 3rd generation partnership project (3GPP) LTE radio interface is used.

The satellite mobile communication system of FIG. 1 may increase data transmission capacity and receiver performance by applying a multiple input multiple output (MIMO) mechanism using satellite multi-beam and polarization of two or more satellites or antennas. A spatial diversity gain for a slow-fading effect of a satellite that may not be obtained by the existing multiple antenna mechanism may be obtained by cooperation communication using the complementary terrestrial component 140 and an Ad-hoc network configuration between the user equipments. The satellite mobile communication system may improve total system throughput by applying the mechanisms for effectively using a frequency.

As described above, the satellite communication system (or, a personal portable satellite mobile communication system) considered in future aims to provide services in countries or suburbs in which a line of sight (LOS) is secured through the satellite and services in an urban area such as the downtown area or the indoor environment in which the satellite signals are not secured through the complementary terrestrial component 140. In order to reduce chip set costs of the user equipment, it is important that the radio interface of the satellite and the radio interface of the terrestrial have commonality. That is, when considering the current market conditions in which the satellite communication service may not solely contend with the terrestrial mobile communication service and the current market conditions aiming to provide the complementary service of the terrestrial network in the area which is not covered by the terrestrial network, if the radio interface for the satellite mobile communication system maximally maintains the commonality with the terrestrial network to receive the satellite mobile services without upgrading the terrestrial user equipment, the radio interface may be expected as preempting an initial business market in the complementary relationship with the terrestrial network As described above, when considering the commonality between the radio interface for the satellite communication system and the terrestrial system, the chip set costs of the user equipment may be reduced. On the other hand, since an advanced technology for the satellite mobile service may not be used in terms of the user equipment, an advanced signal processing technology, or the like, is required. This serves as the overhead to the satellite payroad and thus, limits the entire satellite mobile communication system capacity.

On the other hand, when the satellite solely provides services like a Thuraya system, that is, the satellite solely provides services without considering the commonality with the terrestrial network, the satellite mobile communication system uses the radio interface optimized for the satellite environment like a GMR radio interface, thereby reducing the overhead of the satellite payload and implementing the system optimized for the satellite communication environment.

However, as can be appreciated in the Thuraya system, in order for the user equipment to use both of the satellite mobile communication system and the terrestrial service, the user equipment needs to have the dual chip embedded therein for supporting the satellite radio interface and the terrestrial radio interface. Therefore, the overhead is increased in terms of the user equipment. In the case of the market approach method, the user receiving the terrestrial service does not want the replacement of the user equipment in the initial satellite mobile communication service market which may not gain the competitive advantage over the terrestrial service, such that it is difficult to form an initial business market.

However, when the mobile communication service market grows to some degree, the number of users increases and the satellite mobile communication service users demand the improvement in quality of service. As a result, the increase in system capacity is needed. Since the above case demands the use of the radio interface optimized for the satellite environment, the use of the radio interface optimized for the satellite environment like the Thuraya system may be expected as having more advantages.

In conclusion, the satellite mobile communication system developed up to now aims to select one of the service considering the commonality with the terrestrial network and the communication service optimized for the satellite environment so as to use the radio interface meeting the selected communication service. However, as described above, when considering the advanced direction of the satellite mobile communication service market, it is preferred to consider the communication services considering the commonality in the initial business market and the communication service optimized for the satellite environment in the matured business market. Therefore, it may not determine at this point which direction is the most appropriate. When the satellite mobile communication service starts by selecting any one of the above directions, switching to another direction means the replacement of the entire system in the currently developed system situations, which cannot be realized.

Therefore, the exemplary embodiment of the present invention proposes a flexibly adaptable method according to the future advanced direction of the satellite mobile communication service market while considering both directions rather than the current approach method developing the radio interface by considering only one direction.

Figure 2:
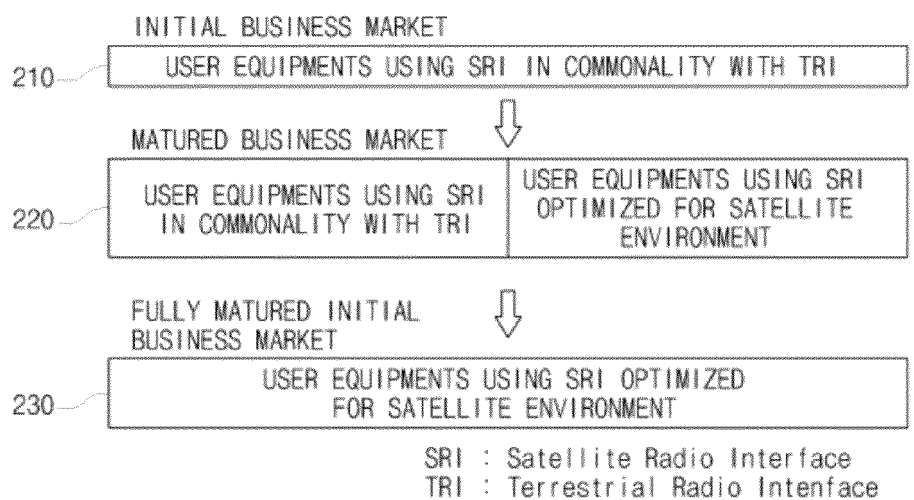
FIG. 2 is a diagram for explaining a method flexibly adapting to the future advanced direction of a mobile communication service market using the satellite mobile system shown in FIG. 1.

FIG. 2 is a diagram for explaining a method flexibly adapting to the future advanced direction of a mobile communication service market using the satellite mobile system shown in FIG. 1.

As shown in FIG. 2, in order to smoothly accommodate terrestrial users in an initial business market 210, services are provided through the satellite radio interface (SRI) in commonality with the terrestrial radio interface (TRI). That is, only the user equipments using the SRI in commonality with the TRI is present in the initial business market.

In order to increase the satellite system capacity in an initially matured business market 220 to some degree, the satellite communication system providing services through the satellite radio interface (SRI) optimized for the satellite environment is provided. The matured business market 220 may be considered as a step starting to provide advanced services to the user equipments (UEs) using the optimized satellite radio interface (SRI) in commonality with the TRI. At this step, the user equipments (UEs) using two types of interfaces may be present in the satellite mobile communication system.

In a fully matured business market 230, the user equipments using only the satellite radio interface optimized for the satellite environment are present.

The exemplary embodiment of the present invention is to propose a flexibly adaptable method according to the advanced direction of the satellite mobile communication service market while considering both directions rather than the current approach method developing the radio interface by selecting only one direction.

Figure 3A:
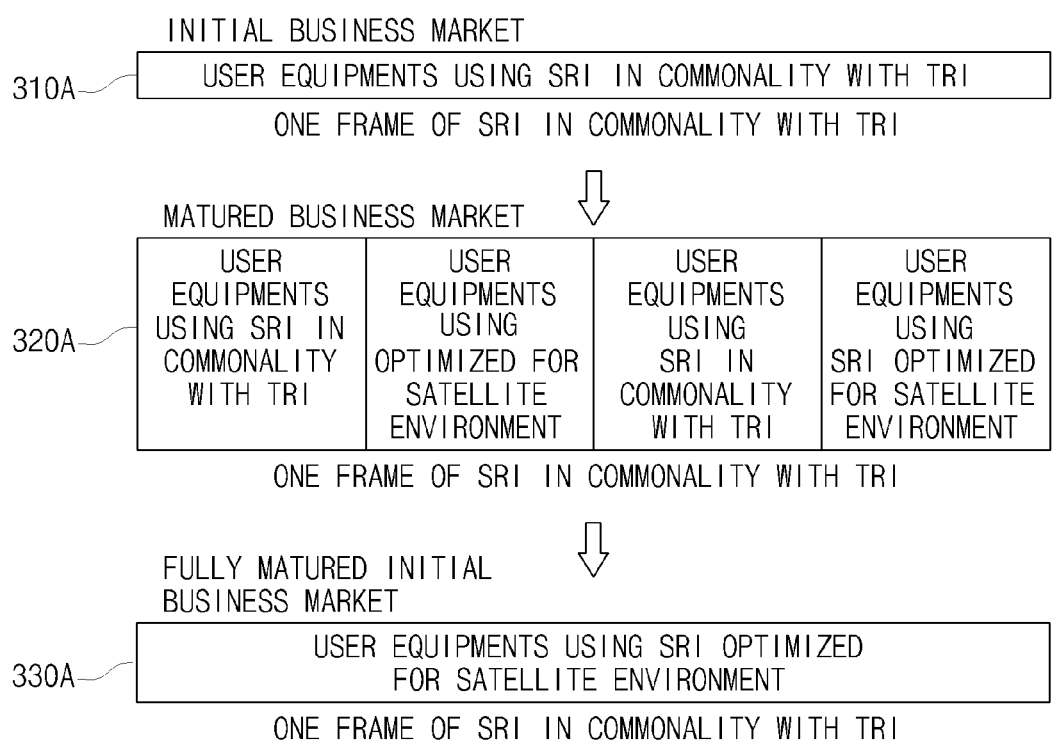
FIGS. 3A and 3B are diagrams for explaining a design method of a frame structure flexibly adapting to the future advanced direction of the mobile communication service market using the satellite mobile communication system shown in FIG. 1.
Figure 3B:
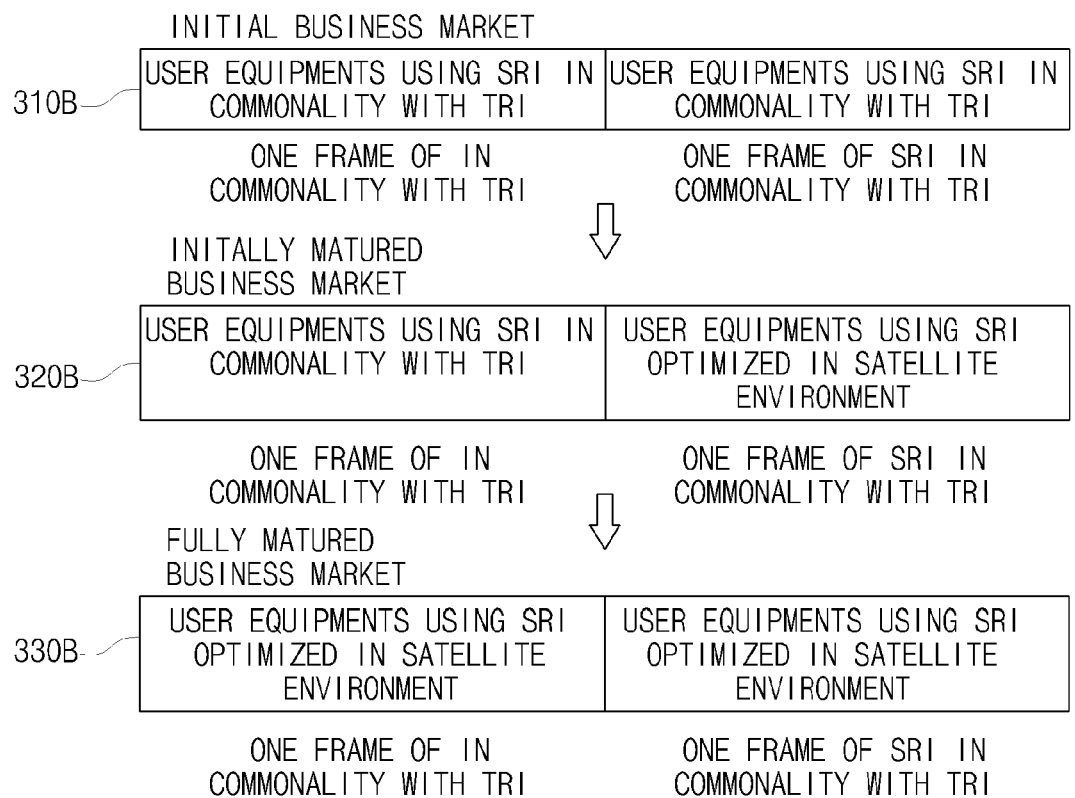

FIGS. 3A and 3B are diagrams for explaining a design method of a frame structure flexibly adapting to the future development direction of the mobile communication service market using the satellite communication system shown in FIG. 1.

Referring to FIGS. 3A and 3B, when using the satellite radio interface (SRI) in commonality with the terrestrial radio interface (TRI) in the initial business market, there is proposed a frame structure design considering forward-compatibility capable of accommodating the user equipments using the radio interface optimized for the satellite environment without affecting the users using the existing radio interface within the frame structure of the satellite radio interface considered in the initial business market in order to use the satellite radio interface (SRI) optimized for the satellite environment without replacing the user equipments and the entire system in a fully matured business market 330A in future.

In an initial business market 310A, a structure of one frame is designed to accommodate the satellite radio interface (SRI) in commonality with the terrestrial radio interface (TRI).

In the initially matured business market 310A to some degree, the structure of one frame is designed so that the satellite radio interface (SRI) optimized for the satellite environment is also accommodated in one frame designed for the initially matured business market 310A. Alternatively, in an initially matured business market 320B to some degree of FIG. 3B, the radio interface optimized for the satellite environment may be accommodated in another frame.

In FIGS. 3A and 3B, an allocation ratio of the frame to another frame between the user equipments UEs using the satellite radio interface (SRI) in commonality with the terrestrial radio interface (TRI) and the user equipments (UEs) using the satellite radio interface (SRI) optimized for the satellite environment may be flexibly adapted in consideration of the system capacity for the user equipments using the satellite radio interface (SRI) in consideration of the commonality with the terrestrial network and the system capacity for the user equipments using the satellite radio interface (SRI) optimized for the satellite environment according to each market condition 310A, 320A, and 330A or 310B, 320B, and 330B. Herein, the system capacity means transmission amount or the number of users.

FIG. 4 is a flow chart for a structure of a flexible frame shown in FIGS. 3A and 3B.

Referring to FIG. 4, the base station (BS) includes system information (SI) indicating intervals in which the user equipments (UEs) using the satellite radio interface (SRI) in commonality with the terrestrial radio interface (TRI) may not perform communications in broadcasting channels or signals, which in turn transmits the system information to the user equipment (S410). Hereinafter, the user equipments using the satellite radio interface (SRI) in commonality with the terrestrial radio interface (TRI) are referred to as conventional user equipments (UEs).

Then, when the conventional user equipments (UEs) initially access the satellite communication system, the conventional user equipments (UEs) obtain the system information (SI) that is included in the broadcasting channels or signals transmitted from the base station (S420). The conventional user equipments (UEs) acknowledge the obtained system information (SI) to obtain the information on some intervals of the frame or some frames that may not be used by the conventional UEs. The conventional UEs obtain reference signals for control information or channel estimation in the rest intervals other than the intervals, that is, some intervals of the frame or some frames that may not be used by the conventional UEs based on the obtained system information (SI).

When obtaining the control information or the reference signal as described above, the conventional UEs try to access the base station based on the obtained control information or reference signal. That is, the conventional UEs accesses the base station in the rest intervals other than some intervals of the frame or some frames that may not be used by the conventional UEs (S430).

Meanwhile, the user equipments (UEs) using the satellite radio interface (SRI) optimized for the satellite environment, that is, the advanced user equipments (UEs) also receive the system information (SI) from the base station to obtain the information on some intervals of the frame or some frames that are not transmitted for the conventional UEs (S440).

Thereafter, the advanced UEs try to access the base station based on the obtained information (S450).

As such, the advanced UEs transmit the satellite radio interface optimized for the satellite environment in the intervals, that is, the intervals in which the conventional UEs may not perform communications, thereby increasing the advanced satellite mobile communication service and the system capacity.

The conventional UEs may not transmit the signals in the transmission intervals defined as described above, while the advanced UEs may transmit signals through the transmission intervals without interfering with the conventional terrestrial radio interface (TRI). As a result, the advanced UEs may flexibly support another satellite radio interface while supporting the services of the conventional UEs without affecting the services of the conventional UEs. Herein, the radio interface optimized for the satellite environment includes all the satellite radio interface (SRI) appropriately designed to be optimized for the satellite environment based on the terrestrial radio interface (TRI). For example, when the conventional satellite radio interface (SRI) has the commonality with the terrestrial long term evolution (LTE) radio interface, the radio interface optimized for the satellite environment is based on the OFDMA in the uplink and based on the SC-FDMA in the downlink. The density of the data signals may be increased by defining power control information optimized for the satellite environment and making the density of the reference signals smaller than the terrestrial radio interface (TRI) in consideration of the satellite channel environment. The power control information unnecessarily transmitted in the satellite environment is cancelled from the radio interface optimized for the satellite environment and a long interleaver is added so as to overcome the slow-fading of the satellite channel. The radio interface optimized for the satellite environment may include all the designed satellite radio interfaces without limiting the commonality with the terrestrial radio interface such as including any access mechanism optimized for the satellite environment. In the flow chart of FIG. 4, a sequence of the conventional UEs and the advanced UEs may be changed.

Hereinafter, in the satellite mobile communication system according to the exemplary embodiment of the present invention considering both conditions, the frame structure and the communication method thereof when using the satellite radio interface in commonality with the 3GPP LTE radio interface (terrestrial radio interface) are described.

In order to provide the satellite service through the user equipments using the 3GPP LTE radio interface, the frame structure of the 3GPP LTE radio interface needs to be applied to the satellite radio interface without being changed. Therefore, the user equipments using the satellite radio interface (SRI) in commonality with the terrestrial radio interface (TRI) in the initial business market receive the communication services in the 3GPP LTE radio interface frame structure.

Next, when the business market is matured to some degree, if the user equipments using the satellite radio interface (SRI) optimized for the satellite environment is considered in the satellite system in order to increase the system capacity, the user equipment using the satellite radio interface (SRI) in commonality with the conventional terrestrial radio interface, that is, the conventional UEs need to be supported with the conventional communication services without recognizing the user equipments using the radio interface optimized for the satellite environment, that is, the advanced UEs. The advanced UEs optimized for the satellite environment need to be supported with the advanced services without affecting the conventional UEs.

Finally, when the conventional UEs are not present in the fully matured business market, the advanced services need to be supported for only advanced UEs using the satellite radio interface optimized or the satellite environment without considering the conventional UEs within the conventional 3GPP LTE radio interface frame structure.

To this end, there are a method for using the multimedia broadcasting and the multicasting service single frequency network (MBSFN) subframe supported in the 3GPP LTE and a method for defining a subframe for the advanced UEs optimized for the satellite by signaling. Herein, the MBSFN is an example for explaining the frame structure proposed in the exemplary embodiment of the present invention but is not limited thereto. The LTE is a system to help understand the exemplary embodiment of the present invention and may also include other broadcasting and communication systems.

First, a method for using the MBSFN subframe is described. Prior to describing the above method, the characteristics of the MBSFN subframe of the 3GPP LTE are described below.

In the case of the subframes of number 0, 4, 5, and 9, the measurement and paging for the radio resource management (RRM) using the subframes are performed, such that the subframes may not be used as the MBSFN.

One or two OFDM symbols may be used for the control channel according to the antenna configuration within the MBSFN subframe. That is, in the LTE radio interface, a common reference signal (CRS) and control channels such as PCFICH/PHICH/PDCCH need to be transmitted in all the subframe over the overall bandwidth.

All the user equipments perform the channel estimation using the CRS, such that the transmission power is fixed. Therefore, when allocating the advanced UEs using the satellite radio interface (SRI) optimized for the satellite environment to the conventional LTE radio interface frame, the consideration therefore is essential.

To this end, the satellite mobile communication system according to the exemplary embodiment of the present invention uses the transmission frame like the conventional LTE communication method for only the user equipments using the radio interface in commonality with the terrestrial network while using the frame structure of the conventional 3GPP LTE radio interface as it is in the initial business market.

On the other hand, in the matured business market to some degree, when there are the users wanting to receive the advanced services or there are demands for the increase in the system capacity due to the increase in the number of users, in order to provide the service for the advanced UEs using the radio interface optimized for the satellite environment even in the conventional radio interface, the satellite mobile communication system according to the exemplary embodiment of the present invention allocates the MBSFN subframe to the conventional radio interface.

The satellite mobile communication system may allocate all the subframes other than MBSFN subframes of number 0, 4, 5, and 9 that may allocated to the conventional radio interface.

The allocated subframes of number may be informed by the PBCH that broadcasts the system information transmitted from the conventional radio interface and the number of allocated subframes may be flexibly allocated in the satellite mobile communication system according to the system capacity between the conventional UEs and the advanced UEs.

When the satellite mobile communication system allocates the MBSFN subframes, the conventional UEs do not obtain the data of the MBSFN recognized through the system information (SI), such that data are transmitted and received through other subframes other than the MBSFN.

However, the conventional UEs may obtain the information on the control channel transmitted from the first one or two OFDM symbols of the MBSFN subframe according to the antenna configuration for uplink allocation grant information and may perform the channel estimation through the CRS that is present in the first one or two OFDM symbols of the MBSFN subframe.

However, since the measurement for the RRM and the CRS for the paging are transmitted while being forcibly allocated to the subframes of number 0, 4, 5, and 9, the subframes of number 0, 4, 5, and 9 may not be as the MBSFN subframe.

On the other hand, the advanced UEs using the radio interface optimized for the satellite environment obtain the number of MBSFN subframes and the allocated subframes of number through the system information transmitted from the base station through the control channel such as the PBCH, or the like, of the conventional radio interface.

The advanced UEs transmit and receive the data only in the MBSFN subframe and may not use the resource since the first one or two OFDM symbols are used for the control channel and the CRS for the conventional UEs according to the antenna configuration in the MBSFN subframe and may design the frame structure optimized for the satellite environment from the next OFDM symbol. For example, the data bit transmission interval may be increased by reducing the density of the reference signal (RS) and a user specific reference signal rather than the common reference signal may be transmitted for beam forming. The structure of the control channel for data transmission may be optimized for the satellite environment and the frame structure may be redesigned so as to be optimized for the satellite environment such as reducing the unnecessarily transmitted power control information, or the like.

When using the conventional MBSFN subframe as described above, the conventional 3GPP LTE radio interface may be reused without modification, but since of the subframes of number 0, 4, 5, and 9 of the 3GPP LTE radio interface may be not used for the MBSFN, the subframes of number 0, 4, 5, and 9 may not be used even when the conventional UEs are not present in future and only the advanced UEs are present. Therefore, the system capacity may be limited. The advanced UEs may not use the resources for the conventional control channel and CRS of one or two OFDM symbols of the MBSFN, such that the unnecessary overhead is present. Similarly, the system capacity may be limited.

In order to supplement this, the frame structure of the terrestrial 3GPP LTE radio interface is slightly modified, such that the method for more flexibly using the MBSFN subframe may be proposed. For example, the conventional LTE based user equipment measures the RRM by using the CRC of the subframes of number 0 and 5 and uses the subframes of number 0, 4, 5, and 9 for paging. In this case, when only the CRS of the subframes of number 0 and 5 for the paging is used, the more flexible transition to the radio interface may be performed by increasing the number of subframes of the possible MBSFN by slightly reducing the paging performance.

Figure 5:
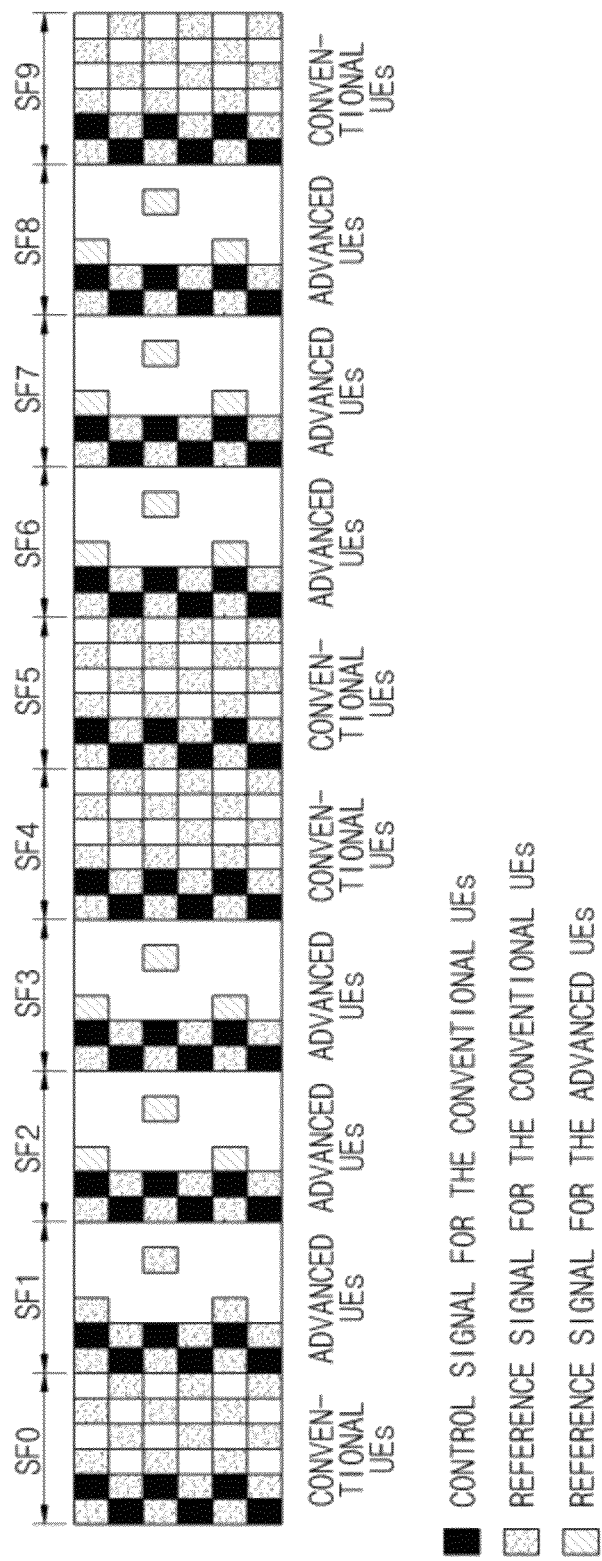
FIG. 5 is a diagram showing a frame structure that flexibly transits a radio interface using MBSFN in the satellite mobile communication system shown in FIG. 1.

FIG. 5 is a diagram showing a frame structure that flexibly transits a radio interface using MBSFN in the satellite mobile communication system shown in FIG. 1.

FIG. 5 shows the case in which subframes SF1, SF2, SF3, SF6, SF7, and SF8 are allocated to the MBSFN subframes and the subframes SF0, SF4, SF5, and SF9 are allocated to the unicasting subframes for the conventional UEs.

The number of MBSFN subframes may be appropriately determined according to the demands for the satellite communication system.

FIGS. 6A to 6D are flow charts showing a communication method capable of flexibly transiting the radio interface using the frame structure shown in FIG. 5.

First, referring to FIG. 6A, the conventional UEs are allocated to the frame structure in commonality with the 3GPP LTE radio interface (S610).

Then, it is confirmed whether the advanced UEs are present in the satellite mobile communication system (S612). Whether the advanced UEs are present may be confirmed by the base station of the satellite mobile communication system. As a result of the confirmation, when the advanced UEs are not present, a process of transiting the radio interface is not performed.

If it is determined that the advanced UEs are present, the system capacity for the conventional UEs and the advanced UEs is calculated in the base station of the satellite mobile communication system (S614). Herein, the system capacity means transmission amount or the number of users. For example, the system capacity of the conventional UEs means the signal transmission amount of the conventional UEs or the number of users of the conventional UEs.

Then, it is confirmed whether the MBSFN subframes are configured by the rest subframes other than only the subframes of number 0 and 5 (S616). In this case, the case in which only the subframes of number 0 and 5 are configured by the MBSFN subframes will be described with reference to FIGS. 6C and 6D.

When the advanced UEs configure (allocate) the MBSFN subframes with subframes other than subframes of number 0 and 5, for example, the rest subframes other than subframes of number 4 and 9, the base station determines (S618) the number of MBSFN subframes according to the ratio of the system capacity calculated in the process (S618).

Then, the base station recognizes the rest subframes other than subframes of number 0, 4, 5, and 9 as the MBSFN subframes (S620) and transmits the system information (SI) including the system information, that is, the number of MBSFN subframes and the allocated numbers to the conventional UEs (S622). Then, the conventional UEs, that is, the user equipments using the SRI in commonality with the TRI obtain the system information (SI) through the control channel including the PBCH from the base station (S624).

Referring continuously to FIG. 6B, the conventional user equipments confirm whether the MBSFN subframes are present in the received subframes based on the system information (SI) received in the base station (S626). If it is determined that the MBSFN subframes are not present, the transition process of the radio interface does not occur.

If it is determined that the MBSFN subframes are present, the access between the base station and the conventional UEs are tried by the MBMS method (S630) when the conventional UEs are not allocated to the MBSFN subframes (S628).

When the conventional user equipments are allocated to the MBSFN subframes (S628), the access between the base station and the conventional UEs are tried in the rest subframes other than the MBSFN subframes (S632).

Thereafter, the user equipments using the satellite radio interface optimized for the satellite environment, that is, the advanced UEs obtain the system information from the base station (S634).

Then, when the advanced UEs are not allocated to the MBSFN subframes (S636), the transition process of the radio interface does not occur.

When the advanced UEs are allocated to the MBSFN subframes (S636), the access between the base station and the advanced UEs are tried in the allocated MBSFN subframes (S638).

Hereinafter, as described above, the case in which only the subframes of number 0 and 5 are configured as the MBSFN subframes in the process (S616) will be described in detail with reference to FIGS. 6C and 6D.

Referring first to FIG. 6C, when only the subframes of number 0 and 5 are configured as the MBSFN subframes in the process (S616) of FIG. 6A, the base station like the process (S618) of FIG. 6A determines the number of MBSFN subframes according to the ratio of the system capacity calculated in the process (S618) of FIG. 6A.

Then, the process of recognizing the MBSFN subframes other than the subframes of number 0 and 5 is performed (S644) and the system information (SI) is transmitted to the conventional UEs through the control channel such as the PBCH from the base station (S646). As a result, the conventional UEs obtain the system information (S648).

Thereafter, it is confirmed whether the MBSFN subframes other than subframes of number 0 and 5 are present in the received by the conventional UEs (S650). If it is determined that the MBSFN subframes are not present, all the processes end.

Figure 6D:
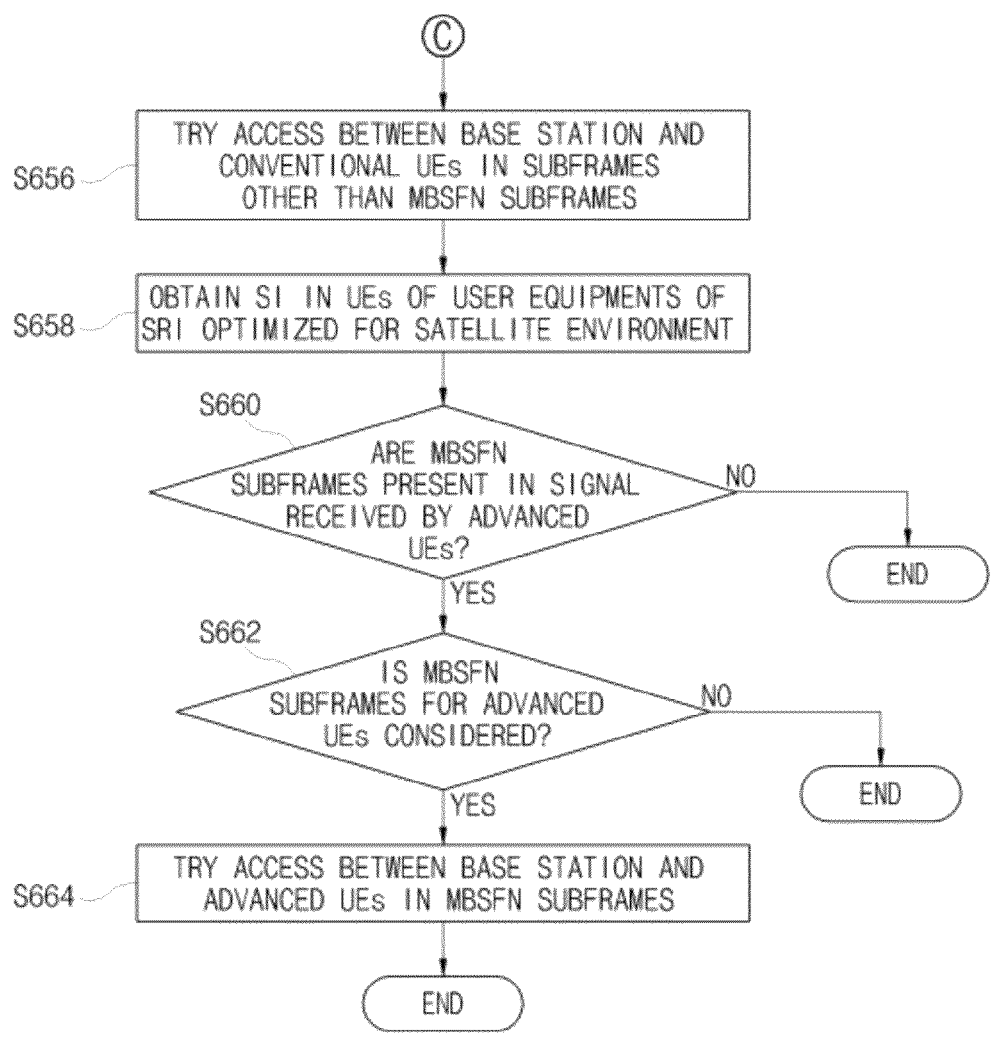

Referring continuously to FIG. 6D, if the MBSFN subframes are present (S650), it confirms whether or not to consider the MBSFN subframes for the advanced UEs (S652). If not, the access between the base station and the conventional UEs is tried by the MBMS method (S654).

Then, the base station performs the access trials to the conventional UEs in the subframes other than the MBSFN subframes (S656) and then, the UEs optimized for the satellite environment, that is, the advanced UEs obtain the system information from the base station (S658).

Then, the advanced UEs confirm whether the MBSFN subframes are present in the received signal (S660) and if not, the transition process of the radio interface is not performed.

If it is determined that the MBSFN subframes are present in the received signal by the advanced UEs, it confirms whether or not to consider the MBSFN subframes for the advanced UEs (S662).

When the MBSFN subframes for the advanced UEs are not considered, the transition process of the radio interface ends and when the MBSFN subframes for the advanced UEs are considered, the access between the base substrate and the advanced UEs is tried in the MBSFN subframes (S664).

As described up to now, in the case of the satellite mobile communication system supporting the advanced UEs by using the MBSFN subframes, the conventional terrestrial LTE radio interface may be used without modification.

However, the resource for the CRS and the control channel to be forcibly transmitted in one or two OFDM symbols in the MBSFN subframe by using the conventional MBSFN subframe may be considered as a signal overhead in terms of the advanced UEs side. This brings about the limitation of the system capacity.

Therefore, the following proposed method adds the MBSFN subframe structure that is not present in the terrestrial LTE radio interface to the satellite LTE radio interface in commonality with the terrestrial LTE radio interface for the conventional UEs, thereby reducing the signaling overhead. That is, the MBSFN subframe defined up to now forcibly transmits the CRS and the control channel in one or two OFDM symbols of the subframe for the conventional UEs. However, in the proposed MBSFN subframe structure, the CRS and the control channel for the conventional UEs are not transmitted. That is, the conventional UEs are defined so as not to use all information that is in the MBSFN subframe by defining new MBSFN subframes so that all the resources of the MBSFN subframes are used for the advanced UEs.

Figure 7:
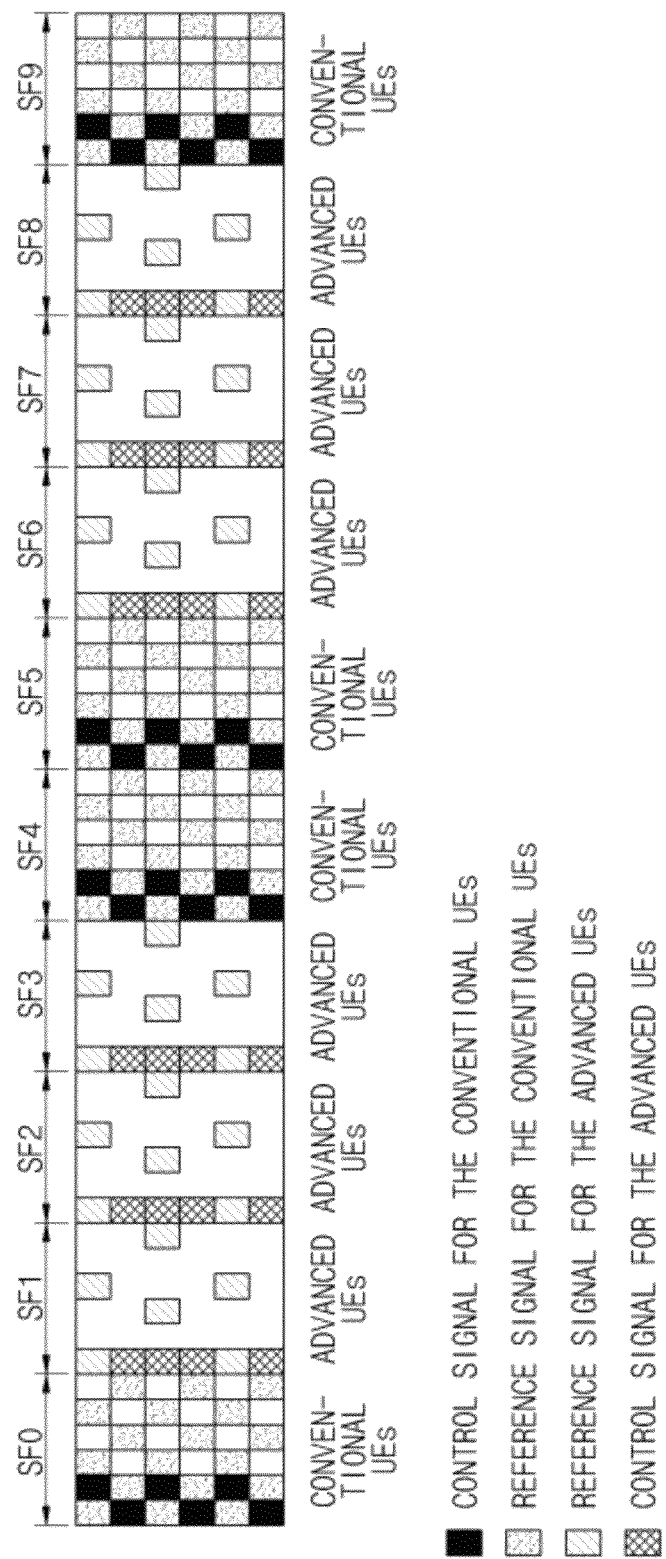
FIG. 7 is a diagram showing the frame structure that flexibly transits the radio interface using MBSFN subframes according to another exemplary embodiment of the present invention.

FIG. 7 is a diagram showing the frame structure that flexibly transits the radio interface using MBSFN subframes according to another exemplary embodiment of the present invention.

As shown in FIG. 7, the structure of the MBSFN subframes may design all the resources of the subframe as the subframes so as to be optimized for the satellite environment since the structure of the MBSFN subframes do not allocate the resources for the conventional UEs, unlike the conventional MBSFN.

The method for supporting the advanced UEs while maintaining the commonality with the LTE radio interface to some degree by using the MBSFN subframes defined in the conventional 3GPP LTE are proposed up to now, but since the methods described above may not use the subframes of number 0, 4, 5, and 9 or subframes of number 0 and 5 that are forcibly used for the conventional UEs for the advanced UEs, the future advanced UEs occupy most of the markets and when the conventional UEs are too few, the subframes may not be effectively used.

Therefore, the next proposed frame structure proposes a radio interface frame structure for transition to the future advanced UEs while slightly disregarding the commonality with the terrestrial LTE radio interface. In this configuration, the proposed frame structure does not consider the limitations for subframes of number 0, 4, 5, and 9 to be forcibly transmitted to the unicasting subframe for the RRM measurement and for paging and the satellite system flexibly allocates all the subframes in the frame to the conventional UEs and the advanced UEs through the system information.

The conventional UEs obtain the information by using only the allocated CRS information in the subframes for the conventional users rather than the RRM and the paging procedure defined in the 3GPP LTE radio interface. The advanced UEs perform the transmission and reception in the subframe structure optimized for the satellite by using the subframe structure that does not include the information on the CRS and the control channel information of the conventional UEs as shown in FIG. 7 in the subframes allocated to the MBSFN.

In the case of the terrestrial network, the channel is suddenly changed within the frame and thus, the channel estimation performance is suddenly changed according to the number and positions of CRSs within the frame, but in the case of the satellite network, the channel is slowly changed and thus, the performance change is slowly changed according to the number and positions of CRSs, which is a sufficient possible method.

FIGS. 8A and 8B are diagrams showing the frame structure that more flexibly transits the radio interface using the MBSFN subframes while slightly disregarding the commonality with the terrestrial radio interface according to another exemplary embodiment of the present invention.

Referring to FIGS. 8A and 8B, the frame structure that transits the radio interface according to another exemplary embodiment of the present invention may use all the subframes as the MBSFN subframes. Therefore, the resources may be more flexibly allocated according to the necessary capacity for the advanced UEs and the conventional UEs.

FIG. 8A shows an example in which the conventional UEs and the advanced UEs share and use the subframes within one frame and FIG. 8B shows another example in which the conventional UEs and the advanced UEs for each frame use different frames.

FIGS. 9A and 9B are flow charts showing a mobile communication method using the frame structure shown in FIGS. 8A and 8B.

Referring to FIGS. 9A and 9B, the conventional UEs are allocated to the frame structure in commonality with the 3GPP LTE (S910). Then, it confirms whether the advanced UEs are present in the satellite mobile communication system (S912). Whether the advanced UEs are present may be confirmed by the base station of the satellite mobile communication system. If it is determined that the advanced UEs are not present, the transition process of the radio interface does not occur.

If it is determined that the advanced UEs are present in the satellite mobile communication system, the base station calculates the system capacity of the conventional UEs and the advanced UEs. Herein, the system capacity means the transmission amount and the number of users of the conventional UEs and the advanced UEs, respectively.

Then, the base station determines the number of MBSFN subframes according to the calculated system capacity ratio (S916) and thus, recognizes the MBSFN subframes (S918).

The base station transmits the information such as the number of MBSFN subframes for the MBSFN subframes (or frame) to the conventional UEs through the control channel such as the PBCH (S920). Therefore, the conventional UEs using the satellite radio interface in commonality with the terrestrial radio interface obtain the system information (S922).

Thereafter, the advanced UEs use the system information to confirm whether the MBSFN subframes are present in the currently received signal (S924) and if not, the transition process of the radio interface does not occur.

If so, it confirms whether or not to consider the MBSFN subframes for the advanced UEs (S926). When the advanced UEs do not consider the MBSFN subframes, the access trial between the base station and the conventional UEs is performed by a MBMS scheme (S938).

If so, the access between the base station and the conventional UEs is tried in the rest frames other than the MBSFN subframes (or frame) (S928).

Thereafter, the advanced UEs using the satellite radio interface optimized for the satellite environment also obtains the system information (SI) from the base station (S930) and the advanced UEs determine whether the MBSFN subframes are present in the received signal based on the obtained system information (SI) (S932). If not, all the processes end.

If so, when the advanced UEs consider the MBSFN subframes (S934), the access trial between the base station and the advanced UEs is performed in the BMSFN subframes (S936).

The frame structure design for flexible transition from the UEs using the satellite radio interface in commonality with the 3GPP LTE radio interface to the UEs using the radio interface optimized for the satellite environment and the communication method thereof are described up to now.

The above-mentioned methods may also be applied to the transition process to the satellite radio interface in commonality with another terrestrial radio interface. For example, in case of the 3GPP WCDMA based radio interface, an SRI-G standard defined as IMT-2000 satellite radio interface in ITU-R recommendation M.1457 as S-UMTS-G standard of Europe is the satellite radio interface developed to be used in the satellite environment without changing the terrestrial 3GPP WCDMA radio interface.

On the other hand, the IMT-2000 satellite radio interface SRI-C standard in the ITU-R recommendation M.1457 is the satellite radio interface optimized for the 3GPP WCDMA radio interface based satellite environment. Therefore, the satellite system using the SRI-G standard as the radio interface may be used as it is without replacing the terrestrial UEs and thus, is advantageous in the initial satellite mobile service market.

On the other hand, the SRI-C standard modifies the terrestrial radio interface and therefore, requires the upgrade of the UEs. However, due to the introduction of the technologies optimized for the satellite environment, the overhead of the satellite payload and the entire satellite system capacity may be increased, which is advantageous in the matured satellite mobile service market.

Therefore, in order to successfully approach the market, in the initial business market, the satellite mobile service is provided using the terrestrial UEs as they are based on the SRI-G radio interface and in the matured business market, the UEs using the radio interface enhancing the SRI-G based on the SRI-C may be flexibly transited to the advanced UEs while supporting the conventional UEs.

To this end, the SRI-G radio interface needs to be developed so as to accommodate the SRI-G enhancement radio interface previously including the advanced technologies of the SRI-C in the SRI-G radio interface in future. That is, the SRI-G needs to consider the forward compatibility and in the case of the SRI-G enhancement radio interface including the advanced technology of the SRI-C, the backward compatibility capable of supporting the UEs using the conventional SRI-G radio interface needs to be secured. That is, the BS using the SRI-G enhancement radio interface needs to support the UEs using the SRI-G and SRI-G enhancement radio interface and the UEs using the SRI-G enhancement radio interface need to communicate with the BS using the SRI-G and SRI-G enhancement radio interface. To this end, the SRI-G radio interface may flexibly transit the UEs using the SRI-G enhancement radio interface to the SRI-G enhancement radio interface without modifying the conventional radio interface by using all the communication methods described above, in the MBSFN slot or frame using the slot or the frame for the MBSFN of the terrestrial 3GPP WCDMA. The information on the MBSFN slot or frame may be obtained through the system information transmitted from the PBCH. When modifying the conventional WCDMA based SRI-G radio interface, the satellite system may flexibly allocate the slot or other frames to the UEs using the SRI-G and the SRI-G enhancement radio interface through the system information, within one frame.

In conclusion, the above-mentioned communication method may be applied to the WCDMA based technology like the transition method based on the LTE by applying the slots instead of the subframes.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a satellite mobile communication system, comprising:
    receiving, by first user equipment from a base station, system information indicating a first time slot in which the first user equipment using a satellite radio interface in commonality with a terrestrial radio interface does not perform communications with the base station;
    accessing the base station by the first user equipment in a second time slot different from the first time slot indicated by the received system information;
    receiving the system information from the base station by second user equipment using a satellite radio interface optimized for a satellite environment; and
    accessing the base station by the second user equipment in the first time slot indicated by the received system information;
    further comprising allocating multimedia broadcast and multicast service single frequency network (MBSFN) subframes to a frame for a third generation partnership project (3GPP) long term evolution (LTE) radio interface by the base station, so that the second user equipment simultaneously supports the 3GPP LTE radio interface, wherein the terrestrial radio interface includes the 3GPP LTE radio interface,
    wherein the allocating of the MBSFN subframes includes:
    calculating, by the base station, a first system capacity including a transmission amount or a number of users of the first user equipment and a second system capacity including a transmission amount or a number of users of the second user equipment; and
    determining a number of MBSFN subframes according to a ratio of the calculated first system capacity of the first user equipment to the calculated second system capacity of the second user equipment, and allocating the MBSFN subframes according to the determined number, wherein the base station uses only a common reference signal (CRS) of subframes of number 0 and 5 for paging, and increases a number of MBSFN subframes other than the subframes of number 0 and 5 so as to be flexibly transited from the satellite radio interface in commonality with the terrestrial radio interface to the satellite radio interface optimized for the satellite environment, wherein the base station adds to a MBSFN subframe structure that is not present in the 3GPP LTE radio interface to the satellite radio interface in commonality with the 3GPP LTE radio interface, and reduces a signaling overhead including the CRS or a control channel for the first user equipment;
    wherein the base station allocates all frames through the system information without considering limitations for subframes of number 0, 4, 5, and 9 to be forcibly transmitted to the first and second user equipments as unicasting subframes for RPM measurement and paging.

2. The method of claim 1, wherein the receiving of the system information by the first user equipment includes allowing the first user equipment to obtain control information or a reference signal for channel estimation in the second time slot.

3. The method of claim 1, wherein the satellite radio interface optimized for the satellite environment does not define power control information unnecessarily transmitted in the satellite environment and is further provided with an interleaver so as to overcome slow-fading of a satellite channel.

4. The method of claim 1, wherein the allocating of the MBSFN subframes includes allocating the MBSFN subframes other than subframes of number 0, 4, 5, and 9.

5. A satellite mobile communication system, comprising:
    first user equipment using a satellite radio interface in commonality with a terrestrial radio interface; and
    second user equipment using a satellite radio interface optimized for satellite environment, wherein the first user equipment receives, from a base station, system information indicating a first time slot in which the first user equipment does not perform communications with the base station, and accesses the base station in a second time slot different from the first time slot, and
    the second user equipment receives the system information from the base station, and accesses the base station in the first time slot;
    further comprising allocating multimedia broadcast and multicast service single frequency network (MBSFN) subframes to a frame for a third generation partnership project (3GPP) long term evolution (LTE) radio interface by the base station, so that the second user equipment simultaneously supports the 3GPP LTE radio interface, wherein the terrestrial radio interface includes the 3GPP LTE radio interface,
    wherein the allocating of the MBSFN subframes includes:
    calculating, by the base station, a first system capacity including a transmission amount or a number of users of the first user equipment and a second system capacity including a transmission amount or a number of users of the second user equipment; and
    determining a number of MBSFN subframes according to a ratio of the calculated first system capacity of the first user equipment to the calculated second system capacity of the second user equipment, and allocating the MBSFN subframes according to the determined number, wherein the base station uses only a common reference signal (CRS) of subframes of number 0 and 5 for paging, and increases a number of MBSFN subframes other than the subframes of number 0 and 5 so as to be flexibly transited from the satellite radio interface in commonality with the terrestrial radio interface to the satellite radio interface optimized for the satellite environment, wherein the base station adds to a MBSFN subframe structure that is not present in the 3GPP LTE radio interface to the satellite radio interface in commonality with the 3GPP LTE radio interface, and reduces a signaling overhead including the CRS or a control channel for the first user equipment;

wherein the base station allocates all frames through the system information without considering limitations for subframes of number 0, 4, 5, and 9 to be forcibly transmitted to the first and second user equipments as unicasting subframes for RPM measurement and paging.

6. The satellite mobile communication system of claim 5, wherein the first user equipment obtains control information or a reference signal for channel estimation in the second time slot.

7. The satellite mobile communication system of claim 5, wherein the terrestrial radio interface is a third generation partnership project (3GPP) long term evolution (LTE) radio interface, and the base station allocates multimedia broadcast and multicast service single frequency network (MBSFN) subframes to a frame for the 3GPP LTE radio interface.

8. The satellite mobile communication system of claim 7, wherein the base station allocates the MBSFN subframes to subframes other than subframes of number 0, 4, 5, and 9.

9. The satellite mobile communication system of claim 7, wherein
the base station calculates a first system capacity including a transmission amount or a number of users of the first user equipment and a second system capacity including a transmission amount or a number of users of the second user equipment; and determines a number of MBSFN subframes according to a ratio of the calculated first system capacity of the first user equipment to the calculated second system capacity of the second user equipment.

10. The satellite mobile communication system of claim 9, wherein the base station uses only a common reference signal (CRS) of subframes of number 0 and 5 for paging, and increases a number of MBSFN subframes other than subframes of number 0 and 5 so as to be flexibly transited from the satellite radio interface in commonality with the terrestrial radio interface to the satellite radio interface optimized for the satellite environment.

* * * * *